(12) United States Patent
Gupte et al.

(10) Patent No.: US 10,462,018 B2
(45) Date of Patent: Oct. 29, 2019

(54) MANAGING A NUMBER OF SECONDARY CLOUDS BY A MASTER CLOUD SERVICE MANAGER

(71) Applicant: HEWLETT PACKARD ENTERPRISE DEVELOPMENT LP, Houston, TX (US)

(72) Inventors: Prashant Gupte, Sunnyvale, CA (US); Stephane Herman Maes, Sunnyvale, CA (US); Ramachandran Varadharajan, Sunnyvale, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 70 days.

(21) Appl. No.: 14/915,652

(22) PCT Filed: Oct. 3, 2013

(86) PCT No.: PCT/US2013/063251
§ 371 (c)(1),
(2) Date: Mar. 1, 2016

(87) PCT Pub. No.: WO2015/050549
PCT Pub. Date: Apr. 9, 2015

(65) Prior Publication Data
US 2016/0241446 A1 Aug. 18, 2016

(51) Int. Cl.
*G06F 15/173* (2006.01)
*H04L 12/24* (2006.01)
(Continued)

(52) U.S. Cl.
CPC ............ *H04L 41/20* (2013.01); *G06F 9/5072* (2013.01); *H04L 41/5054* (2013.01);
(Continued)

(58) Field of Classification Search
CPC ......... H04L 41/20; H04L 47/78; H04L 12/14; H04L 41/5054; H04L 41/5058;
(Continued)

(56) References Cited

U.S. PATENT DOCUMENTS

2011/0022812 A1   1/2011   Van Der Linden et al.
2011/0131309 A1*  6/2011   Akiyama ............... H04L 12/14
                                                    709/223

(Continued)

FOREIGN PATENT DOCUMENTS

EP      2634736 A1        9/2013
WO      WO-2011091056 A1  7/2011
WO      WO-2012176337     12/2012

OTHER PUBLICATIONS

Extended European Search Report, EP Application No. 13895079.5, dated Mar. 10, 2017, pp. 1-10, EPO.

(Continued)

*Primary Examiner* — Taylor A Elfervig
(74) *Attorney, Agent, or Firm* — Hewlett Packard Enterprise Patent Department

(57) ABSTRACT

A method of managing a number of secondary clouds by a master cloud service manager includes coupling a first cloud including a master cloud service manager to a secondary cloud including a child cloud service manager, and controlling, by the master cloud service manager, the child cloud service manager of the secondary cloud and a number of instantiated services offered on the secondary cloud.

18 Claims, 10 Drawing Sheets

(51) Int. Cl.
  *H04L 29/08* (2006.01)
  *G06F 9/50* (2006.01)
  *H04L 12/911* (2013.01)

(52) U.S. Cl.
  CPC ...... *H04L 41/5058* (2013.01); *H04L 41/5096* (2013.01); *H04L 47/70* (2013.01); *H04L 67/10* (2013.01)

(58) Field of Classification Search
  CPC ..... H04L 41/5096; H04L 47/70; H04L 67/10; G06F 9/5072
  USPC .......................................................... 709/226
  See application file for complete search history.

(56) References Cited

U.S. PATENT DOCUMENTS

| | | | |
|---|---|---|---|
| 2011/0271270 A1* | 11/2011 | Bowen | G06F 8/67 717/171 |
| 2011/0296022 A1 | 12/2011 | Ferris et al. | |
| 2011/0320598 A1* | 12/2011 | Solin | G06F 9/5072 709/225 |
| 2012/0110056 A1 | 5/2012 | Van Biljon et al. | |
| 2012/0110651 A1* | 5/2012 | Van Biljon | G06Q 30/04 726/4 |
| 2012/0124211 A1 | 5/2012 | Kampas et al. | |
| 2012/0159572 A1 | 6/2012 | Patel et al. | |
| 2012/0185913 A1 | 7/2012 | Martinez et al. | |
| 2012/0297016 A1 | 11/2012 | Iyer et al. | |
| 2013/0019015 A1 | 1/2013 | Devarakonda et al. | |
| 2013/0179931 A1* | 7/2013 | Osorio | G06F 15/167 725/110 |
| 2013/0232486 A1* | 9/2013 | Chen | G06F 9/455 718/1 |
| 2014/0101320 A1* | 4/2014 | Endo | H04L 47/78 709/226 |
| 2015/0052229 A1* | 2/2015 | Gonzales | H04L 41/0806 709/221 |
| 2016/0019636 A1* | 1/2016 | Adapalli | G06Q 30/0641 705/26.62 |

OTHER PUBLICATIONS

Gedymin, A., "Cloud Computing With an Emphasis on Google App Engine", Master Final Project, everis, Sep. 2011, 146 pages.
International Search Report and Written Opinion, Pot Patent Application No. PCT/US2013/063251, dated Jun. 27, 2014, 10 pages.
Leymann, F., "Cloud Computing: The Next Revolution in IT", Jul. 30, 2009, 10 pages.
Jiang Yi et al., "Construction of Private Cloud Computing Platform Based on Open Source Software," English Abstract, Jan. 2013, pp. 1-8, China Academic Journal Electronic Publishing House.
Weimin Lang and Depeng Yang, "Introduction to Cloud Computing," English Abstract, Dec. 31, 2011, pp. 1-7, China Academic Journal Electronic Publishing House.

* cited by examiner

MANAGING A NUMBER OF SECONDARY CLOUDS BY A MASTER CLOUD SERVICE MANAGER

CROSS-REFERENCE TO RELATED APPLICATION

This application is a U.S. National Stage Application of and claims priority to International Patent Application No. PCT/US2013/063251, filed on Oct. 3, 2013, and entitled "MANAGING A NUMBER OF SECONDARY CLOUDS BY A MASTER CLOUD SERVICE MANAGER," the entire contents of which are hereby incorporated in its entirety.

BACKGROUND

An increasingly large number of business entities and individuals are turning to cloud computing and the services provided through a cloud computing system in order to, for example, sell goods or services, maintain business records, and provide individuals with access to computing resources, among other cloud-related objectives. Cloud computing provides consumers of the cloud with scalable and pooled computing, storage, and networking capacity as a service or combinations of such services built on the above. A cloud may be a public cloud that provides computing, storage, and networking capacity for public use. A cloud may also be a private cloud operated for a single organization. A hybrid cloud may be any combination of public clouds and private clouds. Management of a hybrid cloud and a private cloud may be a difficult task.

BRIEF DESCRIPTION OF THE DRAWINGS

The accompanying drawings illustrate various examples of the principles described herein and are a part of the specification. The illustrated examples are given merely for illustration, and do not limit the scope of the claims.

Throughout the drawings, identical reference numbers designate similar, but not necessarily identical, elements.

DETAILED DESCRIPTION

Figure 1:
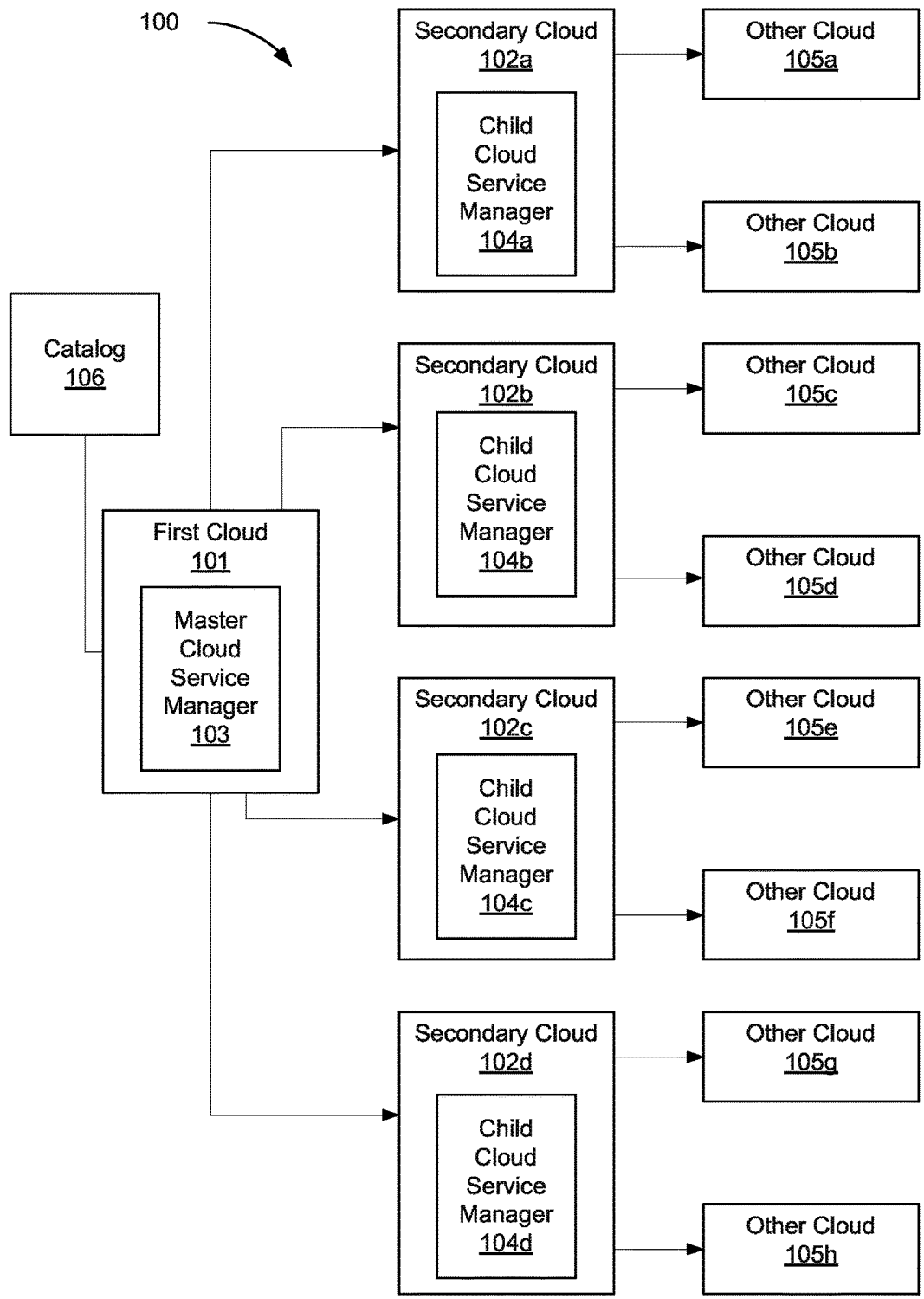
FIG. 1 is a block diagram showing a system for managing a number of secondary clouds by a master cloud service manager, according to one example of the principles described herein.

Cloud computing provides services for a user's data, software, and computation. As described above, a cloud may be a public cloud available for public use. A cloud may be a private cloud that is intended for use by a single organization. A hybrid cloud may be a first cloud, be it public or private, that may manage a secondary cloud, be it public or private. Cloud service managers are used to manage cloud services in the different types of clouds. For example, a cloud service manager may manage cloud services in a private cloud. A cloud service manager may also be used to manage a public cloud, executed as a Software as a service (SaaS) delivery model, for example.

More specifically, cloud services provided to users over a network may be designed, provisioned, deployed, and managed using a cloud service manager. An entity or individual designs, provisions, deploys, and manages a cloud service that appropriately comprises of a number of services, applications, platforms or infrastructure capabilities deployed, executed, and managed in a cloud environment. These designs may then be offered to user who may order, request, and subscribe to them from a catalog via a market place or via an API call, and then manage the lifecycles of a cloud service deployed based on the designs through the same mechanism.

In some examples, a cloud service manager on a public cloud may manage a private cloud. However, doing so presents certain challenges. For example, managing a private cloud via a public cloud may lead to incorrect setup of resource providers. Additionally, managing a private cloud via a public cloud may lead to challenges in discovering, managing, and monitoring the resources in the private cloud from outside the private cloud. The same challenges may exist for cloud services built using these resources. Managing existent firewalls for data exchange via a private cloud is another example of a challenge of managing a private cloud via a public cloud. For example, the firewalls that may be setup for security governance of the private cloud may prevent access or protocols to access, manage, and monitor the resources and cloud services. Additionally, because of the firewalls, and the access challenges they may present, it may be difficult to know the set of resource offerings (i.e., the available resource providers) and the set of cloud services that are available for provisioning to the instantiated services.

Accordingly, the present disclosure describes a method for managing a number of secondary clouds via a master cloud service manager that overcomes the challenges previously presented. More specifically, the present disclosure describes coupling a first cloud to a secondary cloud. The first cloud may be a public cloud that includes a master cloud service manager. The second cloud may be a private cloud that includes a child cloud service manager. The master cloud service manager may control the second cloud via the child cloud service manager. In other words, the master cloud service manager in a public cloud may manage a private cloud by interacting with a child cloud service manager on the private cloud. In some examples, the child cloud service manager may be exposed to the master cloud service manager as a provider of a resource. Other cloud service managers may be treated as resource providers of other services. In some examples, the child cloud service manager may be offered as a self-service through a portal and then downloaded and installed in the private cloud. For example, a user may install the child cloud service manager, which may include downloading artifacts to install the child cloud service manager. In another example, the child cloud service manager may be offered via a virtual appliance installed on a customer's private cloud site. For example, a user may download an image and run the image on a host. In both these examples (i.e., 1) installing and 2) downloading an image), private cloud resources may then be connected to the resource provider and associated with policies, among other management processes.

The systems and methods presented herein may be beneficial in that private cloud services, private cloud service resources, and private cloud resource providers may be viewed from the public cloud. Still further, the systems and methods presented herein may be beneficial in that service designs (e.g., blueprints or topologies) may be designed from the private cloud (i.e., a child cloud service manager) such as CLOUD SERVICE AUTOMATION (CSA 3.2) designed and distributed by Hewlett Packard Corporation, the public cloud (i.e., a master cloud service manager), or combinations thereof. The service designs may then be made available in a catalog to be offered for self-service subscription in the public cloud.

As used in the present specification and in the appended claims, the term "cloud service" is meant to be understood broadly as any number of services provided over a number of computing devices that are connected through a real-time communication network. Cloud services may include services provided on a distributed system implementing distributed hardware and software resources. In one example, a cloud service may be any service offered on a private cloud, public cloud, managed cloud, hybrid cloud, or combinations thereof. A public cloud may include services (an Internet-based service, for example) that are generally available to all potential users. A private cloud may include services that are limited access private services offered over a private network (a business enterprise network, for example).

Further, as used in the present specification and in the appended claims, the terms "node or "computing device" are meant to be understood broadly as any hardware device, virtual device, group of hardware devices, group of virtual devices, or combination thereof within a network. Nodes may include, for example, servers, switches, data processing devices, data storage devices, load balancers, routers, and virtual versions thereof, among many other types of hardware and virtual devices. Further, nodes may be representations of the above hardware and virtual devices before execution and instantiation of a topology of which the node is a part.

Still further, as used in the present specification and appended claims, the term "blueprint" may include instructions associated with deploying, instantiating, configuring, managing, and monitoring, among other operations, the cloud service. While the present disclosure discusses the use of blueprints, the systems and methods disclosed herein may also be implemented using a number of service topologies. A service topology may be data representing a graph of nodes where branches between the nodes represent relationships between the nodes. The nodes may comprise any number of computing devices located within a network. Thus, the topology of a cloud service may comprise the physical and logical layout of networked computing devices, and definitions of the relationships between the computing devices.

Still further, as used in the present specification and in the appended claims, the term "user" is meant to be understood broadly as any individual or entity for whom or by whom a cloud service is designed, provisioned, deployed, monitored, policy enforced, incident remediated, otherwise managed, or combinations thereof. In one example, the user may purchase use of the cloud service at a cost. For example, the user may pay a subscription to use the cloud resources and services, and, in this case, also be classified as a subscriber. In another example, a user may be a designer or administrator of the cloud service. In still another example, a user may be any individual who manages the cloud service.

Even still further, as used in the present specification and in the appended claims, the term "a number of" or similar language is meant to be understood broadly as any positive number comprising 1 to infinity; zero not being a number, but the absence of a number.

In the following description, for purposes of explanation, numerous specific details are set forth in order to provide a thorough understanding of the present systems and methods. It will be apparent, however, to one skilled in the art that the present apparatus, systems, and methods may be practiced without these specific details. Reference in the specification to "an example" or similar language means that a particular feature, structure, or characteristic described in connection with that example is included as described, but may not be included in other examples.

Further, the present systems may be used in a public cloud network, a private cloud network, a hybrid cloud network, other forms of networks, or combinations thereof. In one example, the methods provided by the present systems are provided as a service over a network by, for example, a third party. In another example, the methods provided by the present systems are executed by a local administrator. In still another example, the present systems may be utilized within a single computing device. In this data processing scenario, a single computing device may utilize the devices and associated methods described herein to deploy a cloud service manager. In the above examples, the design of the cloud service, provisioning of a number of computing devices and associated software within the cloud service, deployment of the designed and provisioned cloud resources and services, management of the cloud resources and services, and combinations thereof may be provided as the service.

Aspects of the present disclosure may be embodied as a system, method, or computer program product, and may take the form of hardware, an element combining software and hardware aspects that may all generally be referred to herein as a "circuit," "module" or "system." Furthermore, aspects of the present disclosure may take the form of a computer program product embodied in a number of computer readable mediums comprising computer readable program code embodied thereon. Any combination of a number of computer readable mediums may be utilized.

A computer readable medium may be a computer readable storage medium in contrast to a computer readable signal medium. A computer readable storage medium may be, for example, an electronic, magnetic, optical, electromagnetic, infrared, or semiconductor system, apparatus, or device, or any suitable combination of the foregoing. More specific examples of the computer readable storage medium may include the following: an electrical connection having a number of wires, a portable computer diskette, a hard disk, a random access memory (RAM), a read-only memory (ROM), an erasable programmable read-only memory (EPROM or Flash memory), a compact disc read-only memory (CD-ROM), an optical storage device, a magnetic storage device, or any suitable combination of the foregoing. In the context of this disclosure, a computer readable storage medium may be any tangible medium that can contain, or store a program for use by or in connection with an instruction execution system, apparatus, or device.

Throughout the present disclosure, various computing devices are described. The computing devices may comprise real or virtual computing elements including data processing devices, data storage devices, and data communication devices. Although these various devices may be described in connection with real and physical devices, any number of the devices may be virtual devices. The virtual devices, although describing a software-based computer that is based on specifications of emulated computer architecture and functions of a real world computer, the virtual devices comprise or are functionally connected to a number of associated hardware devices. Accordingly, aspects of the present disclosure may be implemented by hardware elements, software elements (including firmware, resident software, micro-code, etc.), or a combination of hardware and software elements.

Referring now to the figures, FIG. 1 is a block diagram showing a system (100) for managing a number of secondary clouds (102) by a master cloud service manager (103), according to one example of the principles described herein. In general, a cloud service manager (103, 104) may be a computing device that offers and delivers services to manage the life cycles of cloud services for end users. For example, a cloud service manager may instantiate, provision, deploy, monitor, handle events, remediate incidents, and manage cloud services offered on a cloud. In some examples, a cloud service manager may orchestrate the use of application programming interfaces (APIs) for managing the lifecycles of the cloud services.

More specifically, a master cloud service manager (103) may be a computing device that offers and delivers services to manage the lifecycle of services offered on a first cloud (101). The first cloud (101) may be a public cloud. The master cloud service manager (103) may be a virtual appliance for personal use or may be offered as a Software as a service (SaaS). Additionally, the master cloud service manager (103) may offer and deliver services to manage the lifecycle of services offered on a number of secondary clouds (102). For example, via communications with a number of child cloud service managers (104), the master cloud service manager (103) may control the life cycle of cloud services on a number of secondary clouds (102) which may be private clouds. The child cloud service managers (104) may manage and expose services, resources or combinations thereof within the private cloud. More detail concerning the master cloud service manager's (103) control over the number of secondary clouds (102) is given below in connection with FIGS. 2 and 5.

Similarly, a child cloud service manager (104) may be a computing device that offers and delivers services to manage the life cycle of services offered on a secondary cloud (102). In some examples, the child cloud service manager (104) may offer and deliver services based on instructions received from the master cloud service manager (103) as described above and as will be further described in connection with FIGS. 2 and 5. The child cloud service manager (104) may also offer and deliver resources within the private cloud.

In some examples, the child cloud service manager (104) may be a resource provider to the master cloud service manager (103). For example, as described in International Patent App. Pub. No. PCT/US2012/067596, entitled "Generic Resource Provider for Cloud Service," to Gupte et al., which is hereby incorporated by reference in its entirety, a cloud resource may be represented in the master cloud service manager (103) as being provided by a generic service provider, according to its associated function, without tying the resource to a specific type or location or resource. A specific resource for each generic provider specified in a blueprint may be selected from a plurality of available specific providers. In some examples, the child cloud service managers (104) may be the specific providers that provide a specific resource.

A specific provider may represent a specific set of physical or virtual cloud resources that can be used to perform an associated function, and unlike the generic resource, may be tied to a specific location and type of resource. For example, both physical and virtual servers can represent specific providers for a generic server resource, and one specific server resource that might be associated with a generic server resource may include a physical server assembly located in a particular data center. The master cloud service manager (103) may select a secondary cloud (102) and corresponding child cloud service manager (104) to provide a specific resource. The specific resource for each generic resource may be selected according to at least a set of parameters derived from a blueprint. These parameters may include, for example, business policy values, quality of service (QoS) parameters, values drawn from user context, values concerning constraints on available resources in the cloud system, and other contexts of the system or the environment, such as a similarity of network topology. In one example, the master cloud service manager (103) may be a rule-based expert system that determines an appropriate specific provider for each generic provider according to the various parameters associated with the blueprint from which the offering was generated, the identity of the user, the relationship of the user to the system, and constraints on various data centers within the cloud system. For example, the rules of the master cloud service manager (103) may be configured to balance the use of resources across multiple specific resources while providing a service appropriate to the business policy and quality of service requirements of the user.

The policies may be a number of descriptions, metadata, workflows, scripts, rules, or sets of rules that are applicable to guiding the control within a cloud service environment in which the service offering is to be or has been implemented. The policies define the access control and usage control of the APIs used to manage or use the instantiated services.

In some examples, the child cloud service managers (104) may control a number of other clouds via a number of other cloud service managers (105). For example, the child cloud service managers (104) may manage the design, instantiation, execution, monitoring, event handling, and remediation, among other management processes, of other cloud service managers (105). In this example, the child cloud service manager (104) may control other cloud service managers (105) similar to the control of the master cloud service manager (103) over the child cloud service managers (104).

The master cloud service manager (103) may be coupled to a catalog (106) that is a repository of offered services. The catalog (106) may include a number of services generated from blueprints offered by the child cloud service managers (104). For example, as described above, a child cloud service manager (104) may include a number of blueprints; the number of blueprints may be promoted and aggregated with blueprints from other child cloud service managers (104). The aggregated blueprints may be presented to the master cloud service manager (103) and presented as service offerings in the catalog (106) to which the child cloud service managers (104) or other cloud service managers (105) may subscribe.

An example of selecting a service offering via the catalog (106) is given as follows. In this example, each child cloud service manager (104) may include a number of blueprints. Service offerings may be generated as instantiations of the blueprints. The blueprints may be promoted and aggregated into a number of service offerings. The plurality of service offerings are then provided to a user requesting the cloud service via the catalog (106).

In general, the users of the master cloud service manager (103) may select and order cloud services through the master cloud service manager (103) and catalog (106). While cloud services can be selected via user interaction through a service portal or other interface, a service offering may be generated programmatically via APIs that expose cloud functionalities to requesting applications.

As depicted in FIG. 1, the master cloud service manager (103) contains a catalog (106) with a user interface that allows a user to browse and select offered cloud services. Moreover, users may further customize (e.g., configure, for example) details of the selected cloud service; agree to terms and/or conditions for receiving the selected cloud services; order the cloud services (subscribe to the services, pay for the services, and so forth); potentially build or modify a "recipe", specifying a way to combine multiple cloud services or provide lifecycle management; subsequently update the cloud services selection(s); scale up and scale down the cloud services; and in general, manage the lifecycle(s) of the ordered cloud services, including retiring the services. The catalog (106) may be a federation or aggregation of catalogs. The users may browse through the catalog (106) using, for example, a graphical user interface (GUI). In accordance with some implementations, the master cloud service manager (103) may contain one or more APIs/interfaces for purposes of permitting users to browse through the catalog (106). More specifically, via the catalog (106), users may select combinations of various generic resources to form a selected set of cloud services and, in general, set up a service to manage the lifecycle of this combination for a given user or group of users.

Figure 2:
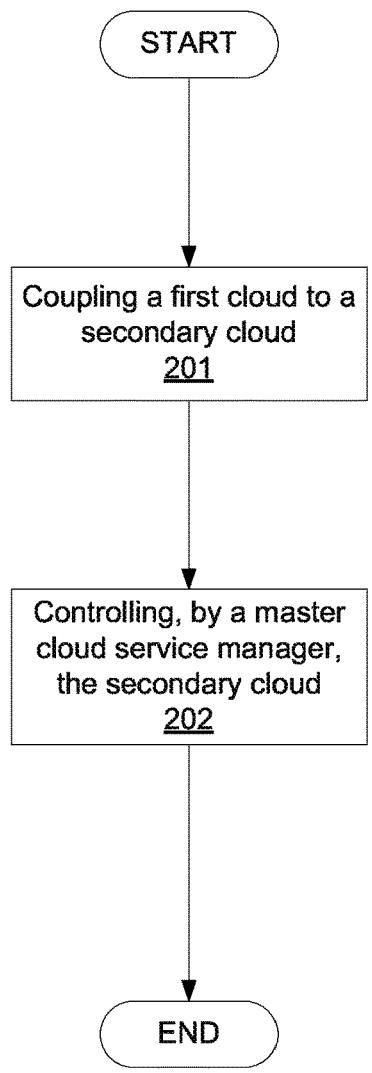
FIG. 2 is a flowchart showing a method for managing a number of secondary clouds by a master cloud service manager, according to one example of the principles described herein.

FIG. 2 is a flowchart showing a method (200) for managing a number of secondary clouds (FIG. 1, 102) by a master cloud service manager (FIG. 1, 103), according to one example of the principles described herein. The method (200) may include coupling (block 201) a first cloud (FIG. 1, 101) to a secondary cloud (FIG. 1, 102). In this example, the first cloud (FIG. 1, 101) may include a master cloud service manager (FIG. 1, 103) that controls the first cloud (FIG. 1, 101), the number of secondary clouds (FIG. 1, 104), or combinations thereof. In some examples, the first cloud (FIG. 1, 101) may be a public cloud, which as described above is a cloud that offers services available to the public in general. By comparison, the secondary cloud (FIG. 1, 102), or a number of secondary clouds (FIG. 1, 102), may be private clouds, which as described above are clouds that offer services available to a limited number of people, for example a single organization. Each secondary cloud (FIG. 1, 102) may include a child cloud service manager (FIG. 1, 104) to provide services, resources or combinations thereof to a secondary cloud (FIG. 1, 102), a number of other clouds, via other cloud service managers (FIG. 1, 105), or combinations thereof. In some examples, the number of secondary clouds (FIG. 1, 102) may be remote to the first cloud (FIG. 1, 101). In other words, the number of secondary clouds (FIG. 1, 102) may be in a different geographic location than the first cloud (FIG. 1, 101). The public cloud and private cloud combination may be referred to as a hybrid cloud. In this example, the public first cloud (FIG. 1, 101) and the private secondary clouds (FIG. 1, 102) are separate entities but may be bound together to enable data and application portability.

The method (200) may also include controlling (block 202), via the master cloud service manager (FIG. 1, 103), the secondary cloud (FIG. 1, 102) or number of secondary clouds (FIG. 1, 102). While FIG. 2 depicts controlling (block 202) the secondary cloud (FIG. 1, 102) or number of secondary clouds (FIG. 1, 102) via a master cloud service manager (FIG. 1, 103), the secondary cloud (FIG. 1, 102) may be controlled from a child cloud service manager (FIG. 1, 104) on the secondary cloud (FIG. 1, 102). If a secondary cloud (FIG. 1, 102) is controlled via a child cloud service manager (FIG. 1, 104), then the actions of the child cloud service manager (FIG. 1, 104) with regards to the controlled secondary cloud (FIG. 1, 102) may be viewed and tracked by the master cloud service manager (FIG. 1, 103).

Returning to FIG. 2, the master cloud service manager (FIG. 1, 103) on the first cloud (FIG. 1, 101) may communicate with a child cloud service manager (FIG. 1, 103) on the secondary cloud (FIG. 1, 104). Controlling (block 202) the secondary cloud (FIG. 1, 102) may include controlling a number of instantiated services that are offered on the secondary cloud (FIG. 1, 102). For example, each instance of a child cloud service manager (FIG. 1, 104) may be a self-sufficient entity managing a logical connection of hardware and software resources, to instantiate services for end user consumption. A group of these child cloud service managers (FIG. 1, 104) may be managed by the master cloud service manager (FIG. 1, 103). Managing the child cloud service managers (FIG. 1, 104) via a master cloud service manager (FIG. 1, 103) may be beneficial in that it enables a hybrid controller that presents a unified user experience.

Controlling (block 202) the secondary cloud (FIG. 1, 102) may include such management steps as deployment, instantiation, monitoring, event handling, and incident remediation, among other management processes.

Controlling (block 220) the secondary cloud (FIG. 1, 102) may include managing content on the secondary clouds (FIG. 1, 102). As described above, via the catalog (FIG. 1, 106) a user may select a consolidated service offering generated from blueprints originating from the child cloud service managers (FIG. 1, 104), or a number of services offered by the child cloud service managers (FIG. 1, 104) that are not consolidated. In this example, the master cloud service manager (FIG. 1, 103) may control these service offerings. Controlling (block 202) the secondary cloud (FIG. 1, 102) may also include the design of a service offering for the secondary cloud (FIG. 1, 102), provisioning of resources to the secondary cloud (FIG. 1, 102), aggregation of blueprints, aggregation of service offerings, and control of the child cloud service manager (FIG. 1, 104), among other forms of control. As described earlier, the first cloud (FIG. 1, 101) may be geographically distinct from the secondary clouds (FIG. 1, 102), accordingly, controlling (block 202) the secondary cloud (FIG. 1, 102) including the design, aggregation, child clouds service manager (FIG. 1, 104), content management, or combinations thereof may be performed remotely.

Figure 3A:
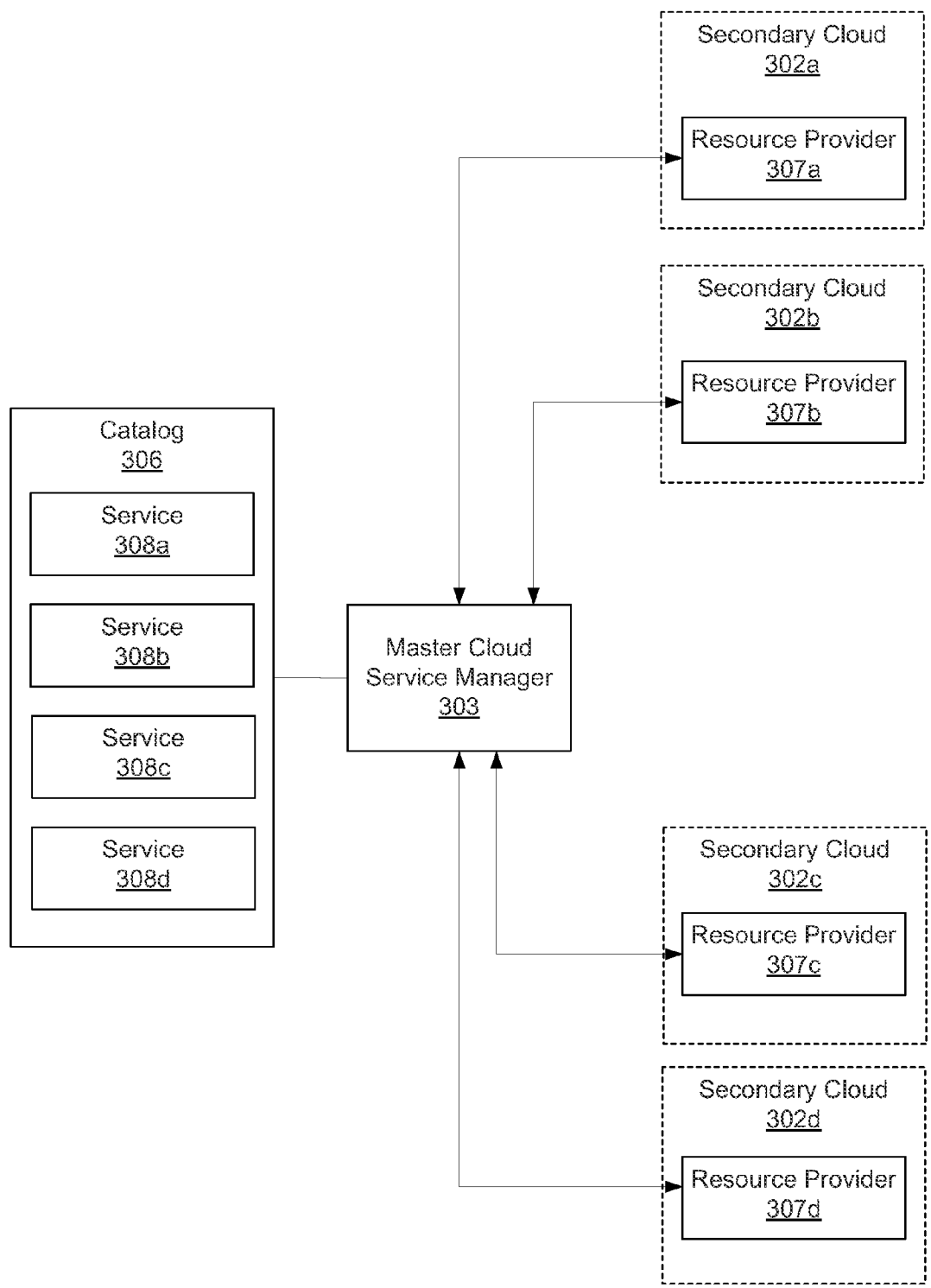
FIGS. 3A and 3B are block diagrams showing a number of resource providers and a catalog, according to examples of the principles described herein.
Figure 3B:
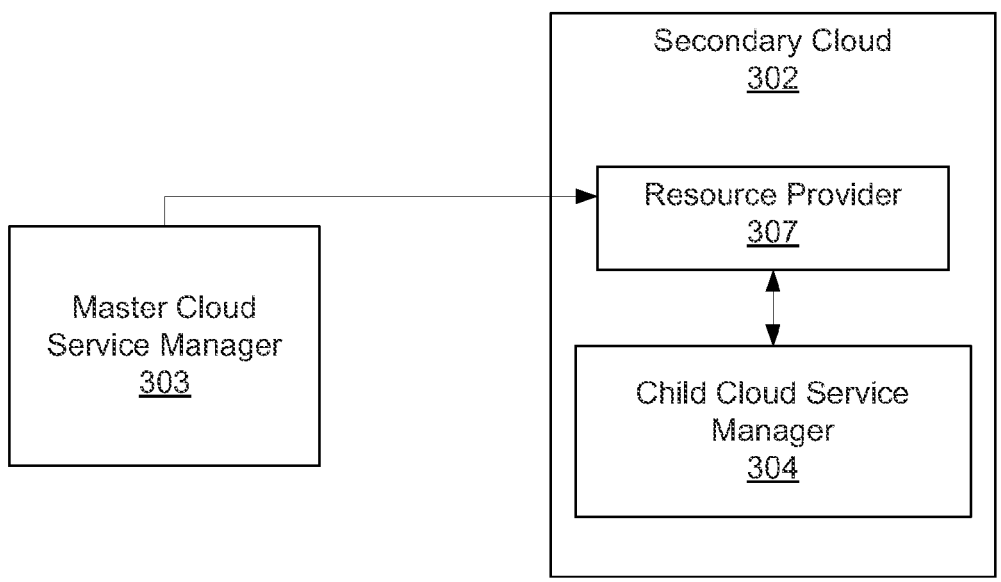

FIGS. 3A and 3B are block diagrams showing a number of resource providers (307) and a catalog (306), according to one example of the principles described herein. As described above, a number of resource providers (307) may be used to provide specific resources for a child cloud service manager (FIG. 1, 104). More specifically, a specific resource for each generic provider specified in a blueprint may be selected from a plurality of available resource providers (307). A resource provider (307) may represent a specific set of physical or virtual cloud resources that can be used to perform an associated function, and unlike the generic resource, may be tied to a specific location and type of resource. The specific resource for each generic resource may be selected according to at least a set of parameters derived from a blueprint. The resource providers (307) may include policies, plugins and other resource management elements. As depicted in FIG. 3A, the resource providers (307) may be a resource provider (307) to the master cloud service manager (303). In this example, the resource provider (307) may be located in the secondary clouds (302). For example, a first resource provider (307a) may be located in a first secondary cloud (302a). Similarly, second (307b), third (307c), and fourth (307d) resource providers may be located in a second (302b), third (302c), and fourth (302d) secondary cloud, respectively. More detail concerning installation and configuration of resource providers (307) located in the secondary clouds (302) is given below in connection with block 404 of FIG. 4.

As depicted in FIG. 3B, the resource provider (307) may be a resource provider to the child cloud service manager (304). In this example, the resource provider (307) may be installed, managed, configured, tracked, or combinations thereof from the first cloud (FIG. 1, 101), the secondary cloud (302) or combinations thereof.

While FIG. 3 depicts resource providers (307) located in the secondary clouds (302), in other examples, the resource providers (307) may be remote to the secondary cloud (302), in the public cloud, for example. In this example, the resource providers (307) may be installed and configured from the first cloud (FIG. 1, 101). More detail concerning installation and configuration of resource providers (307) remote to the secondary clouds (302) is given below in connection with block 405 of FIG. 4. Accordingly, the service designs may be generated remotely or locally to the secondary cloud (302). In either case the service designs may be offered as services (308) in the catalog (306).

After a service (308) is designed, the service (308), or a portion of the service (308) if the service includes resources from the first cloud (FIG. 1, 101) or other hybrid cloud components, may be passed on to the child cloud service manager (FIG. 1, 104) or loaded in a repository on the secondary cloud (FIG. 1, 102). Accordingly, when the service (308) is selected by a user from the master cloud service manager (303), the master cloud service manager (303) may direct the child cloud service manager (FIG. 1, 104) to select life cycle management actions to be performed in the cloud service, based on the parameters. In some examples, the lifecycle management actions may be carried out by a resource provider (307) that executes API calls to perform a function of the service (308).

Figure 4:
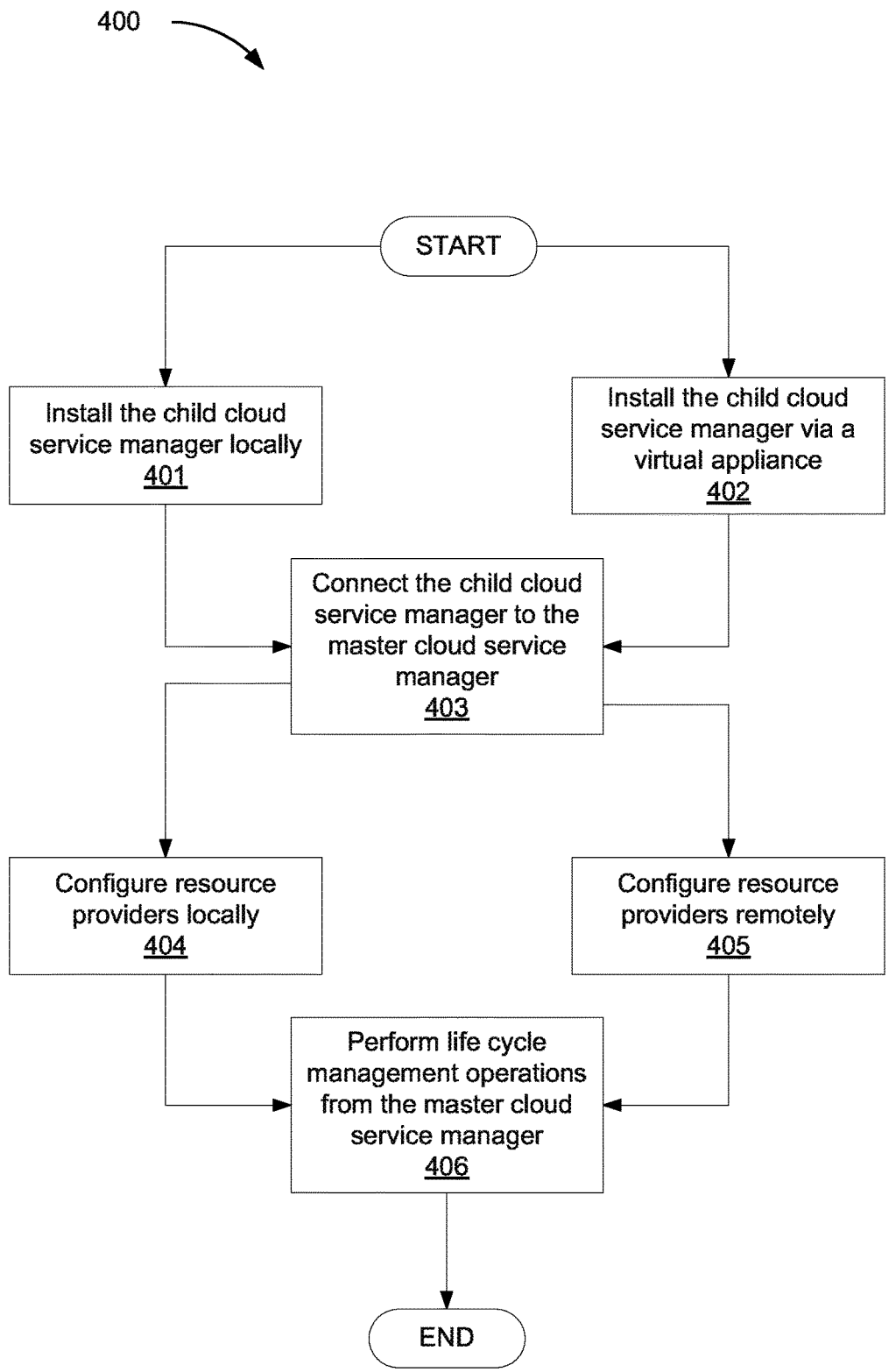
FIG. 4 is a flowchart showing a method for configuring a child cloud service manager, according to one example of the principles described herein.

FIG. 4 is a flowchart showing a method (400) for configuring a child cloud service manager (FIG. 1, 104), according to one example of the principles described herein. Configuring a child cloud service manager (FIG. 1, 104) may include installing the child cloud service manager (FIG. 1, 104). In some examples, the child cloud service manager (FIG. 1, 104) may be installed locally (block 401) via an installation of the artifacts to download the child cloud service manager (FIG. 1, 104). In another example, the child cloud service manager (FIG. 1, 104) may be installed remotely (block 402) as a virtual appliance, for example using a virtual image installation key. In either example (block 401, block 402), the child cloud service manager (FIG. 1, 104) may be connected (block 403) to the master cloud service manager (FIG. 1, 103), such that the resources, services, resource providers, or combinations thereof on the secondary cloud (FIG. 1, 102) may be viewed on the first cloud (FIG. 1, 101). The resource providers (FIG. 3, 307) corresponding to a selected service (FIG. 3, 308) may then be configured. As described in connection with FIGS. 3A and 3B in some examples, the resource providers (FIG. 3, 307) may be resource providers for the master cloud service manager (FIG. 1, 103). In another example, the resource provider (FIG. 3, 307) may be a resource provider for the child cloud service manager (304) and may be located in the secondary cloud (302). In this example, the resource provider (307) may be managed from the first cloud (FIG. 1, 101), the secondary cloud (302), or combinations thereof.

In one example, the resource providers (FIG. 3, 307) may be configured locally. For example, the resource providers (FIG. 3, 307) may be located in the secondary clouds (FIG. 3, 302). In this example, the resource providers (FIG. 3, 307) may be installed and configured in the secondary cloud (FIG. 3, 302). For example, a user who installs a child cloud service manager (FIG. 1, 104) locally may configure the resource providers (FIG. 3, 307) locally (block 404) by selecting which resource providers (FIG. 3, 307) are appropriate. In another example, the resource providers (FIG. 3, 307) may be configured remotely (block 405). For example, the resource providers (FIG. 3, 307) may be located remote to the secondary clouds (FIG. 3, 302). In this example, the resource providers (FIG. 3, 307) may be installed and configured from the first cloud (FIG. 1, 101). For example, the resource providers (FIG. 3, 307) may be configured based on knowledge of the secondary cloud (FIG. 1, 102).

The master cloud service manager (FIG. 1, 103) may perform (block 406) life cycle management operations. For example, when a service (FIG. 3, 308) is instantiated, the instances may be tracked by the child cloud service manager (FIG. 1, 104) (i.e., local instances and components may be tracked) and may be tracked by the master cloud service manager (FIG. 1, 103) (i.e., exact details and references to child cloud service managers (FIG. 1, 104) may be tracked). The master cloud service manager (FIG. 1, 103) may be used to perform (block 406) life cycle management operations such as duplication, modification, retire, copy, and move, among other life cycle management operations, on the instances of the services (FIG. 3, 308). These may be passed to the child cloud service manager (FIG. 1, 104) for execution.

Figure 5:
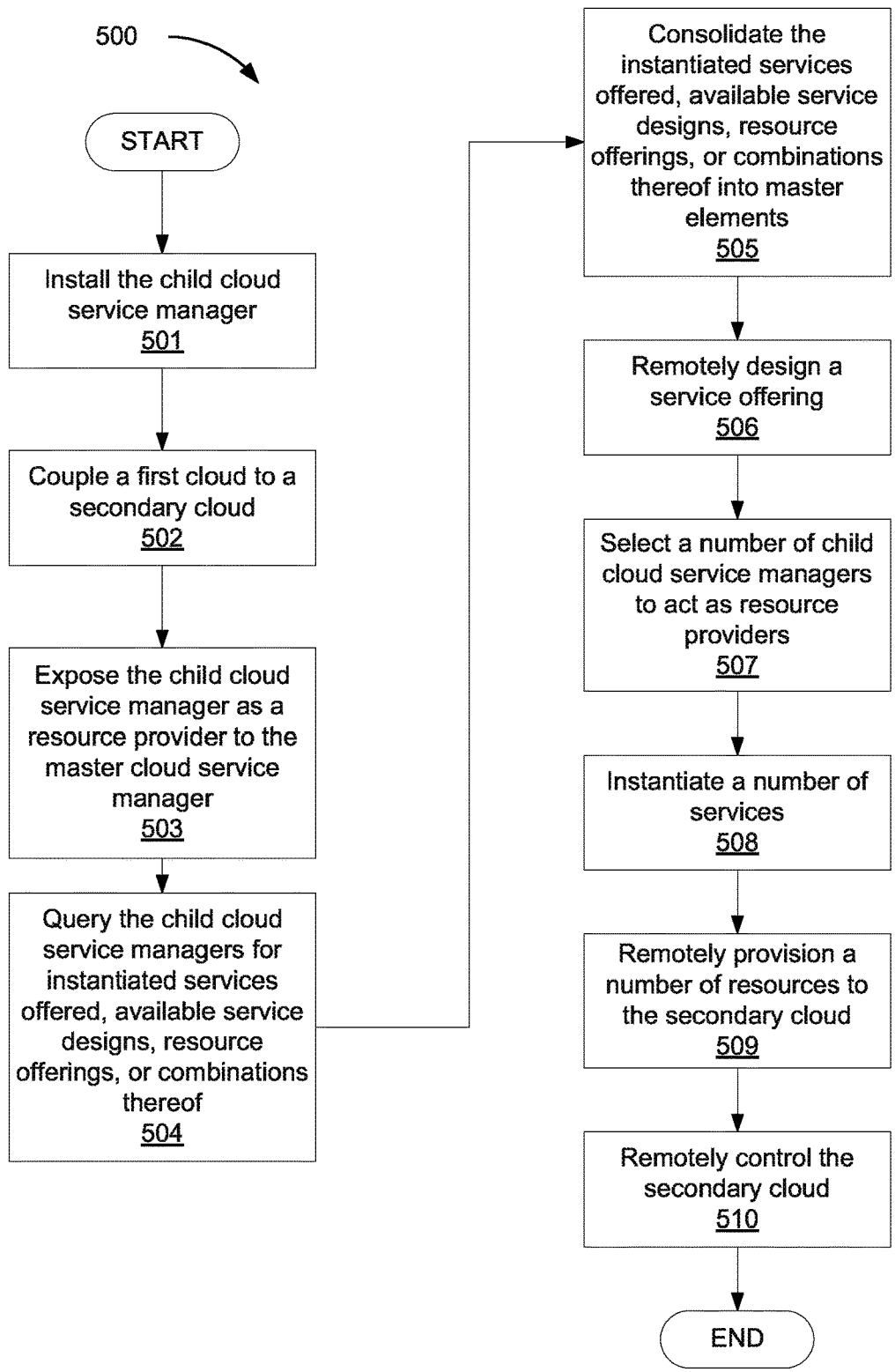
FIG. 5 is a flowchart showing another method for managing a number of secondary clouds by a master cloud service manager, according to one example of the principles described herein.

FIG. 5 is a flowchart showing another method (500) for managing a number of secondary clouds (FIG. 1, 102) by a master cloud service manager (FIG. 1, 103), according to one example of the principles described herein. The method (500) may begin by installing (block 501) the child cloud service manager (FIG. 1, 104). The child cloud service manager (FIG. 1, 104) may be installed via a service portal of the master cloud service manager (FIG. 1, 103). More detail concerning installing the child cloud service manager (FIG. 1, 104) via a service portal is given below in connection with FIG. 8. In other examples, the child cloud service manager (FIG. 1, 104) may be installed via a virtual appliance downloadable to a site on the secondary cloud (FIG. 1, 102). More detail concerning installing the child cloud service manager (FIG. 1, 104) via a downloadable virtual application is given below in connection with FIG. 9.

The first cloud (FIG. 1, 101) may be coupled (block 502) to the secondary cloud (FIG. 1, 102). This may be performed as described in connection with FIG. 2.

The child cloud service manager (FIG. 1, 104) may be exposed (block 503) to the master cloud service manager (FIG. 1, 103) as a resource provider (FIG. 3, 307). As described above, a cloud resource may be represented in the master cloud service manager (FIG. 1, 103) as being provided by a recourse provider (FIG. 3, 307). In some examples, the child cloud service managers (FIG. 1, 104) may be the resource providers (FIG. 3, 307) that provide a specific resource. A resource provider (FIG. 3, 307) may represent a specific set of physical or virtual cloud resources that can be used to perform an associated function, and unlike the generic resource, may be tied to a specific location and type of resource.

Accordingly, the master cloud service manager (FIG. 1, 103) may query (block 504) a number of child cloud service managers (FIG. 1, 104) for instantiated services offered by those child cloud service managers (FIG. 1, 104). In some examples, the master cloud service manager (FIG. 1, 103) may query (block 504) a number of child cloud service managers (FIG. 1, 104) about available service designs or resource offerings in the secondary cloud (FIG. 1, 102). The instantiated services offered, available service designs, resource offerings, or combinations thereof may then be consolidated (block 505), respectively into a master consolidated service, a master service design, a master resource offering, or combinations thereof or otherwise be offered as a service from the master cloud service manager (FIG. 1, 103).

A service offering may then be remotely designed (block 506). For example, a user via the child cloud service manager (FIG. 1, 104) may select a number of resources or services to be offered on the secondary cloud (FIG. 1, 102). Accordingly, the master cloud service manager (FIG. 1, 103) may select (block 507) a number of child cloud service managers (FIG. 1, 104) to act as resource providers (FIG. 3, 307). More specifically, the master cloud service manager (FIG. 1, 103) may select a secondary cloud (FIG. 1, 102) and corresponding child cloud service manager (FIG. 1, 104) to provide a specific resource. The specific resource for each service offering may be selected according to at least a set of parameters derived from a blueprint. These parameters may include, for example, business policy values, quality of service (QoS) parameters, values drawn from user context, values concerning constraints on available resources in the cloud system, and other contexts of the system or the environment, such as a similarity of network topology. In one example, the master cloud service manager (FIG. 1, 103) may be a rule-based expert system that determines an appropriate specific provider for each generic provider according to the various parameters associated with the blueprint from which the offering was generated, the identity of the user, the relationship of the user to the system, and constraints on various data centers within the cloud system. For example, the rules of the master cloud service manager (FIG. 1, 103) may be configured to balance the use of resources across multiple specific resources while providing a service appropriate to the business policy and quality of service requirements of the user.

The designed service offering may then be instantiated (block 508) for use in the secondary cloud (FIG. 1, 102) for example. As part of the instantiation of the service offering, a number of resources may be remotely provided (block 509) to the secondary cloud (FIG. 1, 104) and for subsequent use. Remote provisioning (block 509) may include calling the child cloud service manager (FIG. 1, 104) that is to provide the service design (or portion of a service design) and resources. This may be done by a resource provider (FIG. 3, 307) of the master being selected and selecting the right design and resource providers (FIG. 3, 307) in the child cloud service manager (FIG. 1, 103) by preloading the service design, or passing the service design along with a number of API calls to execute the service design. In other words, once a service offering has been subscribed to, a number of child cloud service managers (FIG. 1, 104) that are resource providers (FIG. 3, 307) will be invoked to provision the resource. The secondary cloud (FIG. 1, 102) and corresponding instantiated service offerings may be remotely controlled (block 510) by the master cloud service manager (FIG. 1, 103). Such remote control may be performed as described in connection with FIG. 2 via a master cloud service manager that is geographically distinct from the secondary cloud (FIG. 1, 104). Remote control (block 510) by the master cloud service manager (FIG. 1, 103) may include indicating instantiated information relating to the secondary cloud (FIG. 1, 102) in the child cloud service manager (FIG. 1, 104) and the master cloud service manager (FIG. 1, 103) either explicitly or by reference to the child cloud service manager (FIG. 1, 104).

Figure 6:
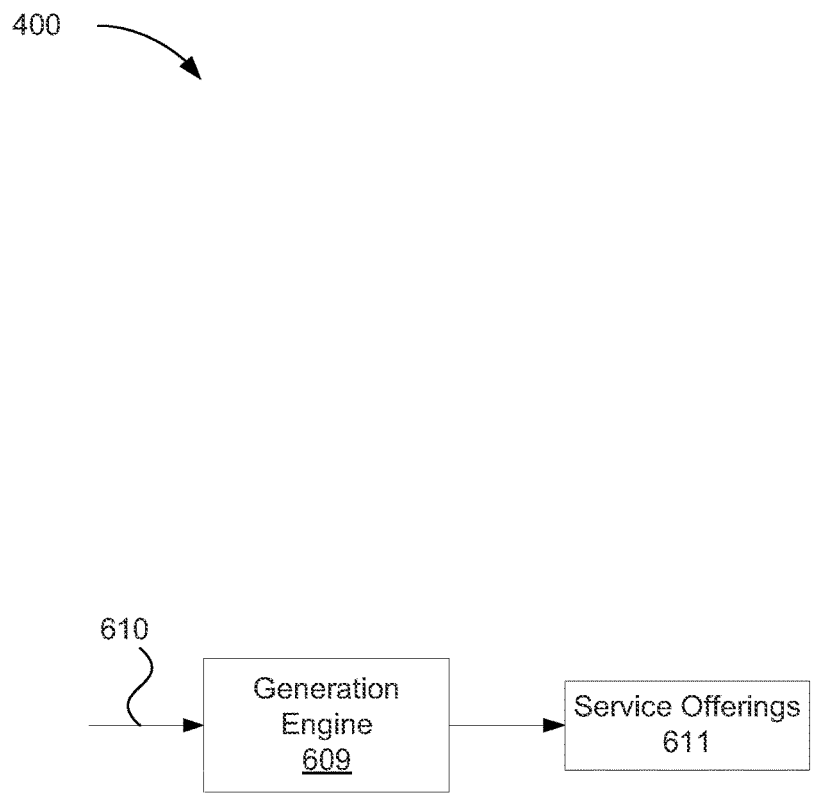
FIG. 6 is a block diagram showing a system for generating a child cloud service manager, according to one example of the principles described herein.

FIG. 6 is a block diagram showing a system (600) for generating a child cloud service manager (FIG. 1, 104), according to one example of the principles described herein. The system (600) may include a generation engine (609) that instantiates and deploys a child cloud service manager (FIG. 1, 104). In one example, the generation engine (609) may be an online dedicated service portal for generation of a child cloud service manager (FIG. 1, 104) on demand. For example, via the generation engine (609), a user may download an installer or may download a virtual image to run on a local host in the secondary cloud (FIG. 1, 102) to generate a child cloud service manager (FIG. 1, 104). In another example, the generation engine (609) may be a downloadable virtual appliance for generation of a child cloud service manager (FIG. 1, 104) on site. The generation engine (609) may receive input information (610) on which generated child cloud service managers (FIG. 1, 104) are based. The input information (610) may include cloud service demos and proof-of-concept systems of cloud services, among other input information (610) . . . . This input information (610) may then be synced in the generation engine (609) as described above by linking resource providers (FIG. 3, 307) with resources used in an instantiated service (FIG. 3, 308). Using this information, the generation engine (609) may generate a child cloud service manager (FIG. 1, 104) and output a number of service offerings (611) in a catalog (FIG. 1, 106) for use by a number of different users.

Figure 7:
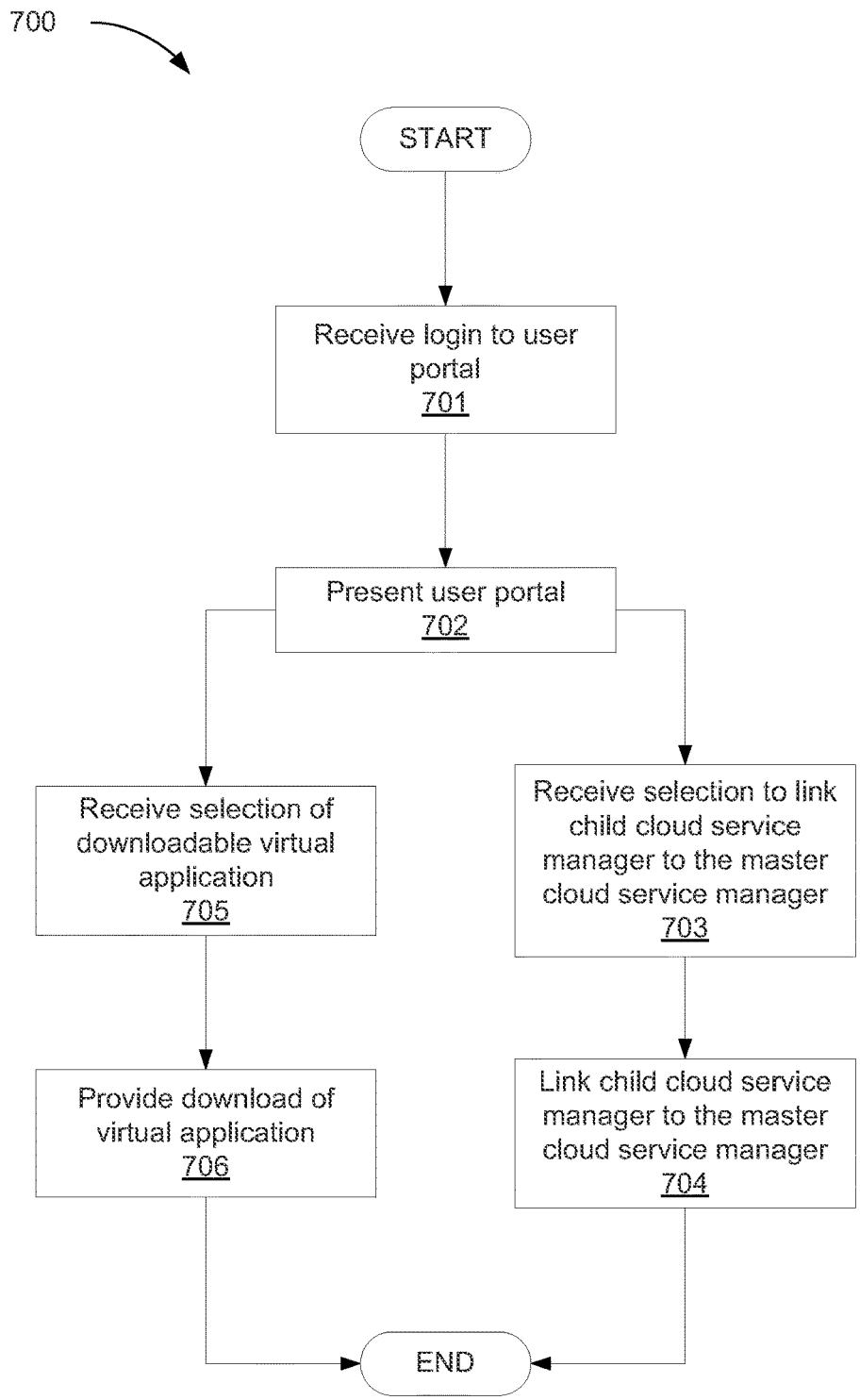
FIG. 7 is a flowchart showing a method for installing a child cloud service manager, according to one example of the principles described herein.

FIG. 7 is a flowchart showing a method (700) for installing a child cloud service manager (FIG. 1, 104), according to one example of the principles described herein. The method (700) may include receiving (block 701) a login to a user portal. For example, a user may request an instance of a child cloud service manager (FIG. 1, 104) be provided, instantiated, or procured for instantiation. As described, there may be a number of ways to request an instance of a child cloud service manager (FIG. 1, 104) be provided such as a self-service installation and a virtual image download. Accordingly, an email may be provided to the user that contains user portal login information. The user may then login to the user portal using information included in the email. While specific reference is made to email communication, the user portal login information may be sent via other forms of communication including a web page and short message service (SMS) text, among other communication forms. A number of different users may seek a service offering from the user portal. Examples of users include administrators, developers, testers, engineers, and document writers, among other users.

A user portal may be presented (block 702). The user portal may be hosted by the first cloud (FIG. 1, 101) such as a server. In the user portal, an interface may be presented to receive a selection on how to install a child cloud service manager (FIG. 1, 104). For example, via the interface, a selection to install a child cloud service manager (FIG. 1, 104) via an online dedicated service portal may be received. Via the online dedicated service portal a child cloud service manager (FIG. 1, 104) may be installed on demand. For example, a user may have an installer and corresponding code and may manually install the child cloud service manager (FIG. 1, 104). In this example, a request may be received to link (block 703) the child cloud service manager (FIG. 1, 104) to the master cloud service manager (FIG. 1, 103). Accordingly, an interface on the online dedicated service portal may be presented to link (block 704) the child cloud service manager (FIG. 1, 104) to the master cloud service manager (FIG. 1, 103). More detail regarding the instantiation of a child cloud service manager (FIG. 1, 104) via the online dedicated service portal is given below in connection with FIG. 8.

Also, via the interface, a selection to generate a child cloud service manager (FIG. 1, 104) via a downloadable virtual appliance may be received (block 705). In this example, a user may get a virtual appliance to run locally and then link the child cloud service manager (FIG. 1, 104) to the master cloud service manager (FIG. 1, 103). Via the virtual appliance, a child cloud service manager (FIG. 1, 104) may be deployed and instantiated on site. Accordingly, the virtual appliance may be provided (block 706) for download. The master cloud service manager (FIG. 1, 104) may then sync the service (FIG. 3, 308) generated with the appropriate resource providers (FIG. 3, 307). More detail regarding the instantiation of a child cloud service manager (FIG. 1, 104) via the virtual appliance is given below in connection with FIG. 9.

In yet another example, a user may allow a master cloud service manager (FIG. 1, 103) to implement public service designs to provide and install the child cloud service manager (FIG. 1, 104) based on information the user enters. Additionally, the resource providers (FIG. 3, 307) may be viewable from the public cloud (FIG. 1, 101).

Figure 8:
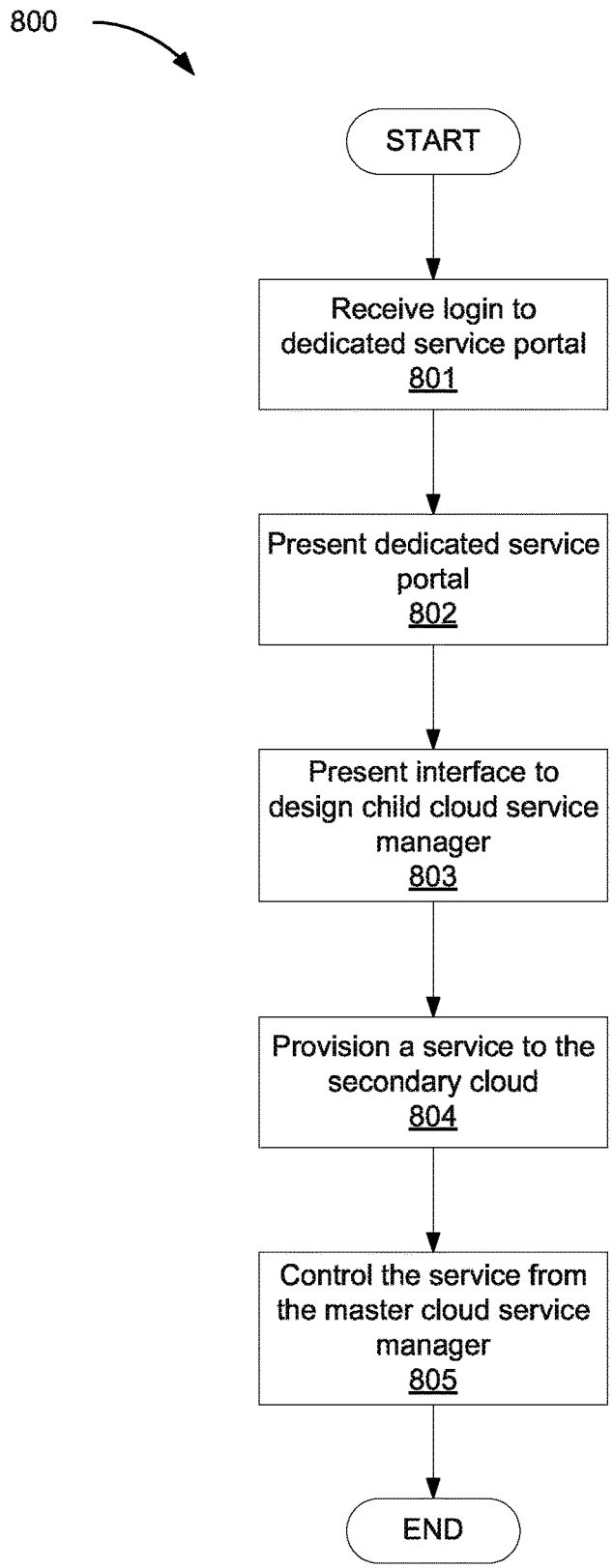
FIG. 8 is a flowchart showing a method for installing a child cloud service manager via a master cloud service manager, according to one example of the principles described herein.

FIG. 8 is a flowchart showing a method (800) for installing a child cloud service manager (FIG. 1, 104) via a master cloud service manager (FIG. 1, 103), according to one example of the principles described herein. The master cloud service manager (FIG. 1, 103) may receive (block 801) a login to a dedicated service portal. For example, a user may request an instance of a child cloud service manager (FIG. 1, 104) be designed. Accordingly, an email, or any other form of communication, may be provided to the user that contains service portal login information. The user may then login to the dedicated service portal using information included in the communication. A number of different users may seek a service offering from the service portal. Examples of users include administrators, developers, testers, engineers, and document writers among other users.

A dedicated service portal may be presented (block 802). The dedicated service portal may be hosted by the first cloud (FIG. 1, 101) such as a server. In the service portal, an interface may be presented (block 803) to design a child cloud service manager (FIG. 1, 104). In some examples the design of the child cloud service manager (FIG. 1, 104) may include setting up the resource providers (FIG. 3, 307) (i.e., syncing the resource providers (FIG. 3, 308) with the service design). In some examples, designing a child cloud service manager (FIG. 1, 104) may include instantiating an existent design. The service portal may present building blocks and resources that may be used to design a child cloud service manager (FIG. 1, 104). From this interface, a user may utilize shared components or request dedicated components. The interface may allow the user to edit a number of resources or other components.

The service may then be provisioned (block 804) on the secondary cloud (FIG. 1, 104). In some examples, this may be performed as described in connection with FIG. 3. More specifically, provisioning (block 804) may include calling the child cloud service manager (FIG. 1, 104) that is to provide a service design (or portion of a service design) and resources. In other words, once a service offering has been subscribed to, a number of child cloud service managers (FIG. 1, 104) that are resource providers (FIG. 3, 307) will be invoked to provision the resource. The service may then be controlled (block 805) via the master cloud service manager (FIG. 1, 103) as described in connection with FIG. 5. More specifically, a master cloud service manager (FIG. 1, 103) may include carrying out life cycle management operations for the secondary cloud (FIG. 1, 104).

Figure 9:
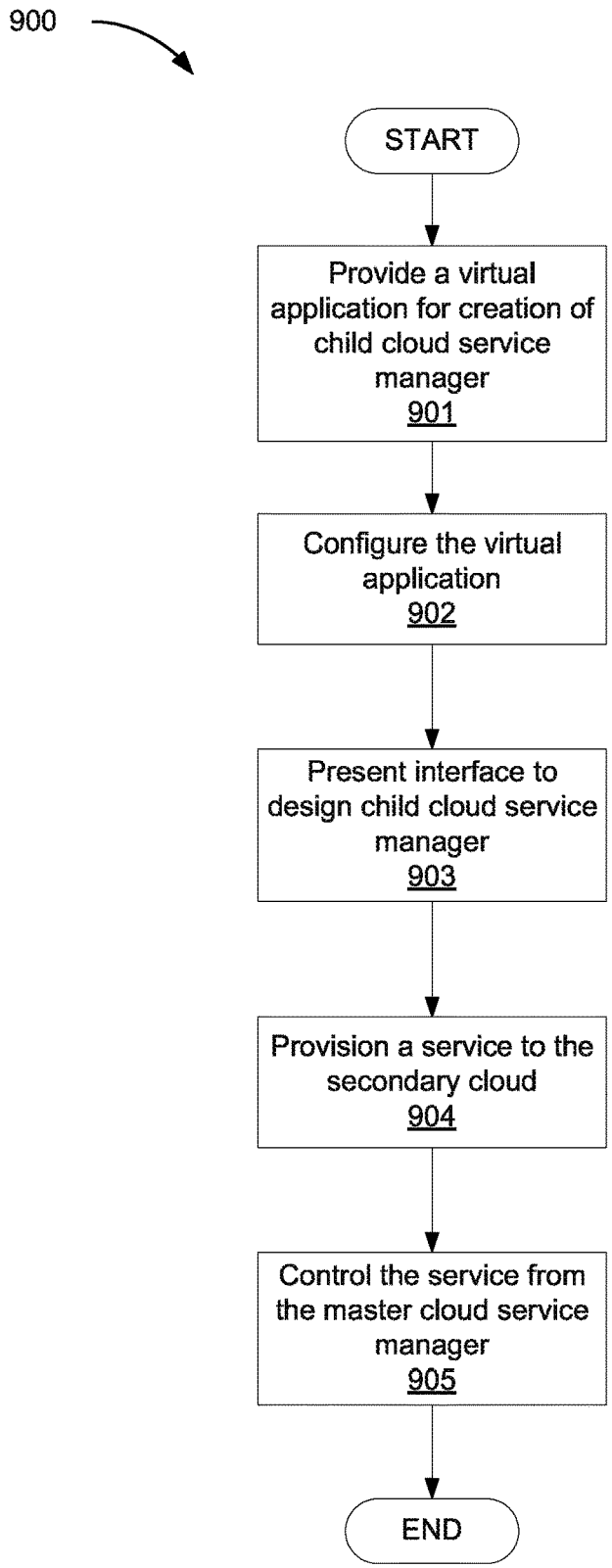
FIG. 9 is a flowchart showing a method for installing a child cloud service manager from the secondary cloud, according to one example of the principles described herein.

FIG. 9 is a flowchart showing a method (900) for installing a child cloud service manager (FIG. 1, 104) from the secondary cloud (FIG. 1, 102) according to one example of the principles described herein. In the method (900) a virtual appliance may be provided (block 901) for creation of a child cloud service manager (FIG. 1, 104). For example, a user may download the virtual appliance from a first cloud (FIG. 1, 101). The virtual appliance may be a virtual technology that deploys a child cloud service manager (FIG. 1, 104) on site.

Upon download, the virtual appliance may be configured (block 902) on site. The virtual appliance may be configured (block 902) based on user supplied information. In some examples, upon download and execution, the virtual appliance may configure itself and may be ready to demonstrate child cloud service manager (FIG. 1, 104) functionality.

The virtual appliance may present (block 903) an interface to design a child cloud service manager (FIG. 1, 104). In some examples, this may be performed as described in connection with FIG. 8. More specifically, the virtual appliance may include canned use cases, or user-selectable use cases of child cloud service manager (FIG. 1, 104) deployment. Via the virtual appliance interface a user may also customize, or edit the building blocks. The service may then be provisioned (block 804) on the secondary cloud (FIG. 1, 104). In some examples, this may be performed as described in connection with FIG. 7. The service may then be controlled (block 805) via the master cloud service manager (FIG. 1, 103) as described in connection with FIG. 8.

Using a virtual application as described herein may be beneficial in that it may allow for a proof-of-concept model of a child cloud service manager (FIG. 1, 104) to be deployed on site. Moreover the virtual application may reduce the period of time to design a child cloud service manager (FIG. 1, 104) as the virtual appliance may include a number of building blocks and typical use cases used by an organization.

Aspects of the present system and method are described herein with reference to flowchart illustrations and/or block diagrams of methods, apparatus (systems) and computer program products according to examples of the principles described herein. Each block of the flowchart illustrations and block diagrams, and combinations of blocks in the flowchart illustrations and block diagrams, may be implemented by computer usable program code. The computer usable program code may be provided to a processor of a general purpose computer, special purpose computer, or other programmable data processing apparatus to produce a machine, such that the computer usable program code, when executed via, for example, a number of processors, implement the functions or acts specified in the flowchart and/or block diagram block or blocks. In one example, the computer usable program code may be embodied within a computer readable storage medium; the computer readable storage medium being part of the computer program product. In one example, the computer readable storage medium is a non-transitory computer readable medium.

The specification and figures describe methods and systems of managing a number of secondary clouds by a master cloud service manager. These systems and methods include, with a processor, coupling a first cloud having a master cloud service manager to a secondary cloud having a child cloud service manager, and controlling, by the master cloud service manager, the child cloud service manager of the secondary cloud and a number of associated instantiated services offered through the secondary cloud.

This management of a number of secondary clouds may have a number of advantages, including: (1) providing a unified controller for a hybrid cloud; (2) managing catalog presentation and organization; (3) providing effective testing, validation, or configuration of child cloud service managers, and (4) remotely controlling the secondary clouds.

The preceding description has been presented to illustrate and describe examples of the principles described. This description is not intended to be exhaustive or to limit these principles to any precise form disclosed. Many modifications and variations are possible in light of the above teaching.

What is claimed is:

1. A method of managing a number of secondary clouds by a master cloud service manager, comprising:
coupling a first cloud that is a public cloud comprising the master cloud service manager to a secondary cloud that is a private cloud comprising a child cloud service manager;
querying, via the master cloud service manager, the child cloud service manager for a plurality of instantiated services offered to the master cloud service manager, wherein a portion of the plurality of instantiated services are from other cloud service managers managed by the child cloud service manager;
remotely installing the child cloud service manager via a virtual appliance using a virtual appliance key where an instantiated service of the plurality of instantiated services of the secondary cloud is viewable on the first cloud;
controlling, by the master cloud service manager, the child cloud service manager of the secondary cloud and the plurality of instantiated services on the secondary cloud selected from a catalog including the plurality of instantiated services offered to the master cloud service manager; and
selecting the instantiated service wherein details of the selected instantiated service are customized via the catalog.

2. The method of claim 1, in which:
the child cloud service manager manages services, resources, or combinations thereof within the private cloud, in which the services are provisioned by the secondary cloud, the first cloud, other clouds, or combinations thereof.

3. The method of claim 1, further comprising:
exposing the child cloud service manager as a resource provider to the master cloud service manager; and
syncing the resource provider to a portion of the instantiated service provided by the resource provider.

4. The method of claim 3, further comprising:
selecting the child cloud service manager to act as the resource provider; and
managing a plurality of resources on the secondary cloud based on a plurality of policies, quality of service (QoS) information, secondary cloud constraints, or combinations thereof, in which the managing the plurality of resources includes selecting, configuring, or combinations thereof, the plurality of resources.

5. The method of claim 1, further comprising remotely provisioning a plurality of resources to the secondary cloud from the master cloud service manager.

6. The method of claim 1, further comprising: remotely designing a plurality of service offerings; and instantiating the number of service offerings for use in the secondary cloud.

7. The method of claim 1, further comprising:
provisioning installers, a virtual image, or combinations thereof, from the master cloud service manager; and
installing the child cloud service manager via a service portal of the master cloud service manager based on the installers, the virtual image, or combinations thereof.

8. The method of claim 1, further comprising:
discovering resource providers of the plurality of instantiated services; and configuring the resource providers.

9. The method of claim 1, further comprising;
consolidating the plurality of instantiated services offered, the service designs, the resource offerings, or combinations thereof, into a master service;
offering the master service in the service catalog; and
remotely managing the plurality of instantiated services offered, the master service, or combinations thereof.

10. The method of claim 1, further comprising:
providing a resource to the child cloud service manager via a resource provider in the secondary cloud; and
managing the resource provider via the child cloud service manager, the master cloud service manager, or combinations thereof, in which managing the resource provider includes installing, configuring, and tracking the resource provider.

11. A system for managing a plurality of secondary clouds, comprising:
one or more processors in communication with one or more memories storing instructions, the one or more processors executing the instructions to provide:
a master cloud service manager in a first cloud that is public to remotely install a child cloud service manager via a virtual appliance using a virtual appliance key such that a plurality of instantiated services of a second cloud is viewable on the first cloud; and the child cloud service manager in the second cloud that is private to offer a plurality of instantiated services selected from a catalog of services provided by the master cloud service manager, wherein a portion of the plurality of instantiated services are from other cloud service managers managed by the child cloud service manager and the master cloud service manager remotely controls the child cloud service manager and the plurality of instantiated services selected from the catalog of services on the second cloud, in which controlling the child cloud service manager comprises querying the child cloud service manager for the plurality of instantiated services offered to the master cloud service manager, and tracking the plurality of instantiated services, and wherein details of a selected instantiated service are customized via the catalog.

12. The system of claim 11, in which the child cloud service manager has been deployed via artifacts installed from the first cloud.

13. A non-transitory computer readable medium storing instructions for managing a plurality of secondary clouds by a master cloud service manager that when executed by a processing resource, cause the processing resource to:
couple a first cloud that is public comprising a master cloud service manager to a secondary cloud that is private comprising a child cloud service manager;
query, via the master cloud service manager, the child cloud service manager for a plurality of instantiated services offered to the master cloud service manager, wherein a portion of the plurality of instantiated services are from other cloud service managers managed by the child cloud service manager;
remotely install the child cloud service manager via a virtual appliance using a virtual appliance key such that an instantiated service of the plurality of instantiated services of the secondary cloud is viewable on the first cloud;
control, via the master cloud service manager, the secondary cloud and a plurality of instantiated services on the secondary cloud, wherein the plurality of instantiated services is selected from a catalog including the plurality of instantiated services offered to the master cloud service manager;
select the instantiated service wherein details of the selected instantiated service are customized via the catalog; and
perform life cycle management operations on the plurality of instantiated services.

14. The medium of claim 13, wherein resources for at least one of the instantiated services is remotely provided by the master cloud service manager.

15. The medium of claim 14, wherein the resources are from a resource provider of a different child cloud service manager in a different second cloud.

16. The medium of claim 15, wherein the different child cloud service manager is selected based on the resources that are provided by the different cloud service manager that satisfy parameters defined by a blueprint for one of the plurality of instantiated services.

17. The medium of claim 16, wherein the parameters comprise business policy values, quality of service parameters, or secondary cloud constraints.

18. The medium of claim 13, further comprising:
remotely design a plurality of service offerings and instantiate the plurality of service offerings for use in the secondary cloud.

* * * * *